Oct. 10, 1950 — W. J. BROWN — 2,524,761
PHASE SHIFT SYSTEM
Filed Aug. 28, 1947 — 4 Sheets-Sheet 1

INVENTOR.
Walter J. Brown
BY Woodling and Krost
attys

W. J. BROWN 2,524,761

PHASE SHIFT SYSTEM

Filed Aug. 28, 1947

INVENTOR.
Walter J. Brown
BY
Hoodling and Krost
attys

Patented Oct. 10, 1950

2,524,761

UNITED STATES PATENT OFFICE 2,524,761

PHASE SHIFT SYSTEM

Walter J. Brown, Cleveland Heights, Ohio

Application August 28, 1947, Serial No. 770,968

24 Claims. (Cl. 323—122)

My invention pertains in general to phase shifting systems, and more particularly to sensitive phase shifting systems that are capable of shifting the phase of the output voltage more than 180 degrees relative to the input voltage. Reference may be had to my copending applications entitled "Phase Shift Network," "Phase Shift Bridge," and "Phase Shift Circuit," application Serial Nos. 770,966, 770,967, and 779,909. This application is a parent application of my continuation-in-part application, Ser. No. 172,647, entitled "Motor Control Circuit," filed July 8, 1950.

An object of my invention is a phase shifting system for shifting the phase of the output voltage while maintaining substantially constant magnitude with respect to a reference voltage.

Another object of my invention is a phase shifting system containing reactive elements for establishing an output voltage which, relative to a reference voltage, will have a large angle of phase shift for a small change in the reactance of one of the elements.

Another object of my invention is a phase shifting system including an inductive and a capacitive branch serially connected to establish an output voltage between an output terminal at the junction of the two branches and another output terminal of the network, which output voltage will remain substantially constant in magnitude while varying in phase relative to a reference voltage upon the varying of the relative reactance of the two branches.

Still another object of my invention is a phase shifting system including a first and second reactive branch serially connected and excited by a reference voltage in which the output voltage of the network will vary in phase but not in magnitude relative to the reference voltage when the reactance of the first reactive branch is varied while maintaining a substantially constant Q in that branch.

Another object of my invention is a phase modulator for a phase modulated radio transmitter that is capable of more than plus or minus 90 degree shift in phase with a substantially constant magnitude of output voltage.

Another object of my invention is a phase modulator for a phase modulated radio transmitter in which reactance tubes are employed in push pull to which the carrier and modulation inputs are applied, and from which the output has a substantially constant magnitude but is variable in phase by more than plus or minus 90 degrees.

Another object of my invention is a phase shifting system for a grid controlled rectifier supplying rectified current to a direct current motor.

Other objects and a fuller understanding of my invention may be had by referring to the following description and claims, taken in conjunction with the accompanying drawing, in which:

Figure 1:
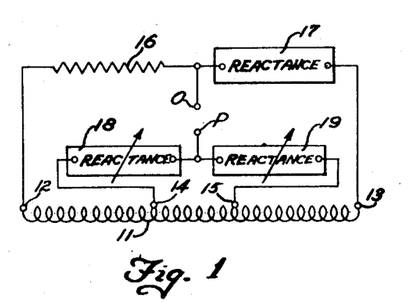
Figure 1 is a circuit diagram of a phase shifting system embodying my invention.
Figure 4:
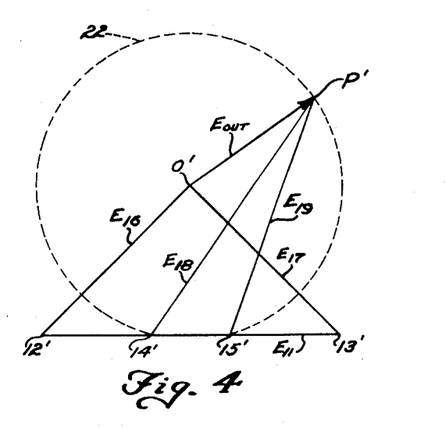
Figure 4 is a voltage vector diagram depicting the voltage vectors obtained from the circuit shown in Figure 1.
Figure 5:
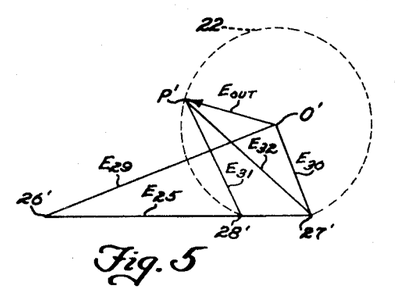
Figure 5 is a voltage vector diagram depicting the voltage vectors obtained from the circuit shown in Figure 2.
Figure 6:
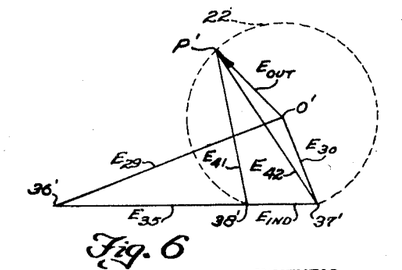
Figure 6 is a voltage vector diagram depicting the vectors obtainable from the circuit of Figure 3.

My invention provides a novel method for obtaining the circular locus as shown on the voltage vector diagrams of Figures 4, 5 and 6, in which the output voltage of the phase shift system is the radius of this circle. A phase shifting system to obtain the circular locus of the vector diagram of Figure 4 is shown in Figure 1. In Figure 1, 11 represents a winding which is energized from an alternating voltage source. The winding 11 may represent the secondary of a transformer, or may be connected directly to some alternating or periodic voltage source. The winding 11 has a first and a second end terminal 12 and 13 respectively, and a first and a second mid-terminal 14 and 15 respectively. A resistance or resistive element 16 and a first reactance or reactive element 17 are serially connected between the end terminals 12 and 13. A second reactance or reactive element 18 and a third reactance or reactive element 19 are serial connected between the mid-terminals 14 and 15. A first and a second output terminal O and P respectively are provided for obtaining the output voltage which varies in phase with respect to the input voltage. The first output terminal O is connected to the junction of the resistance 16 and the first reactance 17, and the second output terminal P is connected to the junction of the second reactance 18 and the third reactance 19.

To more fully understand the operation of this circuit, further reference may be made to Figure 4. In Figure 4, the base line has been designated $E_{11}$, which is the voltage vector depicting the voltage in the winding 11. The voltage developed across the resistance 16 has been designated $E_{16}$, and likewise the voltages across the reactances 17, 18 and 19 have been designated $E_{17}$, $E_{18}$ and $E_{19}$. The potential at the first output terminal O with respect to the voltage of the winding 11 is designated in the vector diagram as the vector potential at the point O′, which is substantially at the center of a circular locus 22 of the point P′. The point P′ represents the potential at the second output terminal P. In the Figure 1, the reactances 18 and 19 have been shown as being variable, and it is to be understood that either or both may be variable as long as the relative reactance is capable of being varied. By varying the relative reactance of the reactances 18 and 19, the point P′ may be made to describe the circular locus shown by the dotted circle 22. As the reactance 18 increases in magnitude with respect to the magnitude of the reactance 19, the point P′ will move in a clockwise direction toward the point 15′, with the point 15′ as a limit. Conversely, as the magnitude of the reactance 19 is increased with respect to the magnitude of the reactance 18, the point P′ will move in a counter-clockwise direction having the point 14′ as a limit. The output voltage which appears between the first and second output terminals O and P is designated by the heavy line vector $E_{out}$, and it will therefore be seen that this vector may be rotated in phase nearly 360 degees with respect to the base line voltage $E_{11}$ as the reactances 18 and 19 are respectively varied. The point O′ has been established by the vectors $E_{16}$ and $E_{17}$ which have been shown as being substantially in quadrature, and the point O′ has judiciously been placed at or close to the center of the circular locus 22, in order that the output vector $E_{out}$ may remain reasonably constant in amplitude while being varied in phase rotation. The locus of point P will be substantially circular providing that the phase angles or Q values of the reactances 18 and 19 remain substantially constant. Since this will result in a constant angle 14′—P′—15′, the locus of point P corresponding to 22′ will therefore be a circle as is well known from geometrical theory.

Methods of keeping the Q substantially constant are known to those skilled in the art, and one such method is to employ a thermionic reactance tube as the variable reactance. The preferred form of reactance tube comprises a pentode or tetrode having a very high internal plate resistance such that the plate current is substantially independent of plate voltage. The pentode or tetrode is operated at constant screen voltage, and an alternating current feedback circuit is provided from plate to grid so as to establish an alternating current grid-cathode voltage which is substantially in quadrature with the alternating current plate-cathode voltage, and which is superimposed on a direct current negative grid-biasing voltage. The alternating current plate current is in phase with the alternating current grid-cathode voltage and is accordingly substantially in quadrature with the alternating current anode-cathode voltage. Accordingly, the tube exhibits the properties of a reactance having a Q which is dependent upon how nearly the phase angle of the alternating current feedback circuit approximates 90 degrees.

The magnitude of the reactance is varied by varying the mutual conductance of the tube by altering either the direct current negative grid bias or the direct current screen voltage. The phase angle of the reactance remains constant since it is equivalent to the phase angle of the alternating current feedback circuit which is not varied.

Figure 2:
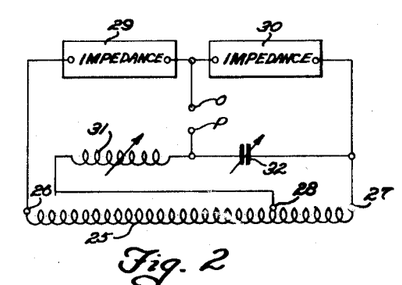
Figure 2 is a modification of my phase shift system.

Figure 2 represents a modification of the circuit shown in Figure 1, and is energized from a winding 25. The winding 25 has a first and a second end treminal 26 and 27, and a mid-terminal 28. A mid-terminal is defined for the purpose of this specification as a terminal situated at any intermediate point upon a winding, not necessarily the center-point. First and second impedances 29 and 30 respectively are serially connected across the end terminals 26 and 27. An inductance or inductive element 31 and a capacitance or capacitive element 32 are serially connected across that portion of the winding 25 which is between the terminals 28 and 27. First and second output terminals O and P respectively are again provided, the first output terminal O being connected to the junction of the impedances 29 and 30, and the second output terminal P being connected to the junction of the inductance 31 and the capacitance 32. The voltage vector diagram of Figure 5 will be used in conjunction with the Figure 2 for explanation thereof. The base line vector $E_{25}$ depicts the voltage of the winding 25 with the voltage at the terminals 26, 27 and 28 represented by the points 26′, 27′ and 28′. The point O′ is again established by substantially quadrature voltages, which quadrature voltages are designated by $E_{29}$ and $E_{30}$, representing the voltages across the impedances 29 and 30 respectively. The point P′ on the circular locus 22 is established by the potential at the second output terminal P. The point P′ represents the potential obtained at the junction of the inductive element 31 and the capacitive element 32. $E_{out}$ is again the output voltage represented by the vector between the points O′ and P′. The inductance 31 and the capacitance 32 have again been shown as both variable, but it is to be understood that either one or both may be variable. The output voltage $E_{out}$ may again be varied nearly 360 degrees, with little variation in magnitude.

Figure 3:
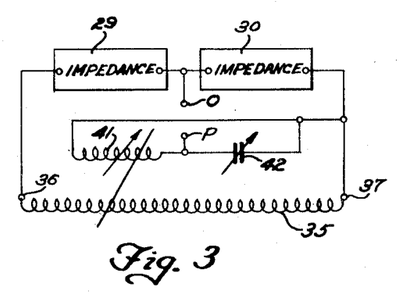
Figure 3 is a still further modification of my phase shifting system.

Figure 3 shows a further modification of my circuit wherein the alternating voltage input is obtained across a winding 35. The winding 35 has end terminals 36 and 37, with the impedances 29 and 30 serially connected across these end terminals, and with the first output terminal O connected therebetween. An inductance 41 and a capacitance 42 are serially connected with the second output terminal P connected therebetween. These serially connected reactance elements 41 and 42 have a circuit that is closed upon itself and this circuit joins the circuit of the impedances 29 and 30 at the end terminal 37. In this modification, the inductance 41 is inductively coupled to the winding 35, and obtains its voltage thereby.

Figure 6 is a voltage vector diagram depicting the voltage vectors of the circuit of Figure 3. The impedances 29 and 30 again establish substantially quadrature voltages represented by the vectors $E_{29}$ and $E_{30}$, which vectors establish the point O′. The inductance 41 and the capacitance 42 establish voltage vectors $E_{41}$ and $E_{42}$ to establish the point P′ on the circular locus 22. Vector $E_{41}$ represents the self induced voltage in the inductance 41, and the vector $E_{42}$ represents the voltage obtained across the capacitance 42 between the output terminal P and the end terminal 37. The voltage vector labeled $E_{ind}$ on the Figure 6 between the point 37′ and 38′ represents the voltage mutually induced into the inductance 41 from the alternating current source 35, which will lie along the base line vector E35, because it will be either directly in phase or directly out of phase with this base line vector.

The novel design of my circuit permits obtaining an output voltage which is capable of being varied in phase nearly 360 degrees without any appreciable change in magnitude. In order to prevent distortion of the circular locus 22, the Q of the reactances must remain constant while being varied. This is possible by correct design of the reactance elements. It will be seen that the greater the Q of the reactance elements, the greater will be the output voltage, and the more nearly a complete 360 degree phase shift that can be obtained.

Throughout the description of the three circuits, the circuit elements establishing the potential at the first output terminal O have been described as establishing substantially quadrature voltage. It will readily be seen that the voltages so obtained from said circuit elements need not be even substantially in quadrature as long as the point O′ is placed at or near the center of the arcuate locus 22 by voltage vectors having a smaller or larger angle than 90 degrees therebetween. An advantage in making such vectors substantially in quadrature would be to lessen the magnitude of the input voltage, but this advantage might be overridden by the disadvantage of necessitating that one of the elements be nearly a pure reactance and one a resistance, or that both elements be to at least some extent reactive.

If constant magnitude of output voltage is not essential, but merely a large angle of phase shift desirable, then particular care need not be taken to establish the point O′ at the center of the arcuate locus 22, and also particular care need not be taken to maintain a substantially constant Q in the variable element.

Figure 7:
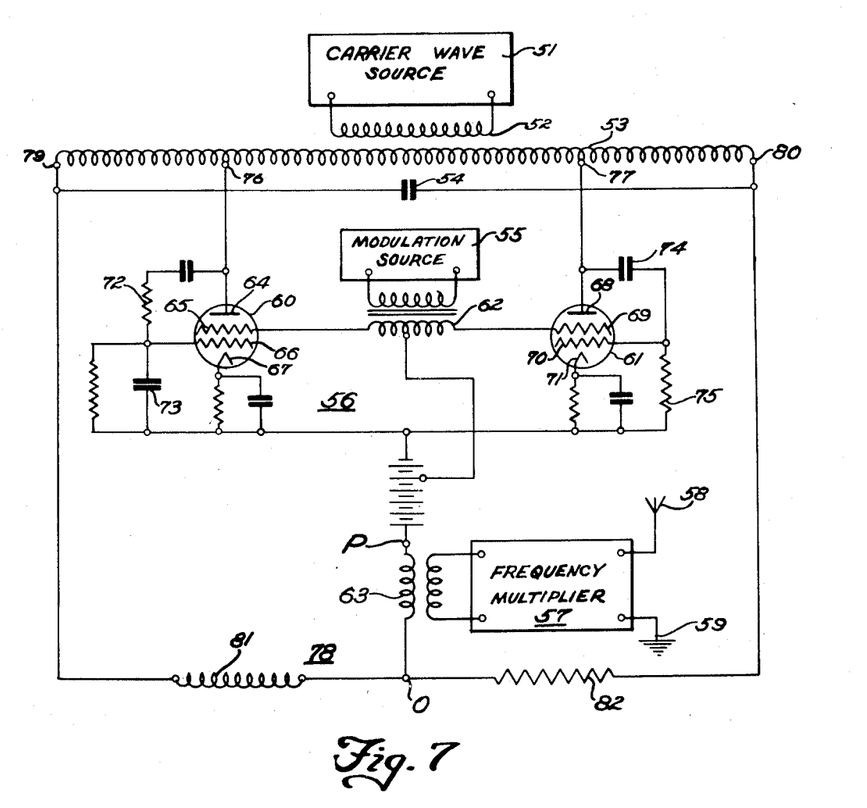
Figure 7 is a circuit diagram of a phase modulated radio transmitter embodying my invention.

Figure 7 illustrates a phase modulated radio transmitter embodying the principles of my invention and adapting them to a high quality radio transmitter. The transmitter includes a carrier wave source 51, a modulation source 55, a phase modulator 56 responsive to the two said sources, and a frequency multiplier 57 energized by the phase modulator 56. In the Figure 7, the carrier wave source 51 energizes a primary winding 52, which in turn energizes a secondary winding 53. The winding 53 has mid-taps 76 and 77, and end terminals 79 and 80. A condenser 54 is connected across the end terminals 79 and 80 of the secondary winding 53 to form a "tank" circuit or parallel resonant circuit. The modulation source 55 supplies modulation energy to the phase modulator 56, which in turn supplies phase modulated carrier waves to the frequency multiplier 57. The frequency multiplier 57 is illustrated in block form, and shows the output as being applied between an antenna 58 and ground 59, or alternatively the output may be applied to an amplifier. The phase modulator 56 includes a first and a second reactance tube 60 and 61, a modulation transformer 62, a branch circuit 78, and an output transformer 63. The branch circuit 78 includes an inductance 81 and a resistance 82 connected across the end connections 79 and 80 of the secondary winding 53. The first reactance tube 60 has an anode, a screen grid, a control grid and a cathode with reference numbers 64, 65, 66, and 67 respectively, and the second reactance tube 61 has like elements designated respectively 68, 69, 70 and 71. The first reactance tube 60 is connected in the circuit to act as an inductance, by virtue of a resistance 72 connected between the anode 64 and control grid 66, and a condenser 73 connected between the control grid 66 and the cathode 67. The second reactance tube 61 is connected in the circuit to act as a capacitance, by virtue of a condenser 74 connected between the anode 68 and control grid 70, and a resistance 75 connected between the control grid 70 and cathode 71. The phase modulator 56 is energized from the secondary winding 53, with the plates of the reactance tubes being connected across the midtaps 76 and 77, and the branch circuit 78 being connected across the end terminals 79 and 80 of the secondary winding 53. The modulation source 55 supplies modulation energy through the modulation transformer 62 to the screen grids 65 and 69 in a push-pull relationship. A first output terminal O is connected at the junction of the inductance 81 and the resistance 82 of the branch circuit 78, and a second output terminal P is electrically connected to the interconnected cathodes 67 and 71 of the reactance tubes. The output transformer 63 is connected across these two output terminals O and P, and supplies modulated carrier wave energy to the frequency multiplier 57.

In operation, the carrier wave source 51 supplies carrier wave energy to the tank circuit 53—54. The action of the condenser 54 in the tank circuit is to provide a heavy circulating current therein, thereby keeping the voltage across the midtaps 76 and 77 in phase with the voltage across the end connections 79 and 80 regardless of the amount of load current drawn by the phase modulator 56. The carrier wave energy is supplied in push-pull to the two reactance tubes 60 and 61, because one tube is connected as an inductance and the other as a capacitance, with modulation wave energy applied to the screen grids of these tubes. This modulation wave energy varies the relative reactance of these two reactance tubes, and as may be seen on the voltage vector diagram of Figure 4, as these reactances are relatively varied, the output will maintain a substantially constant magnitude variable in phase by at least plus or minus 90 degrees and quite easily plus or minus 120 degrees. The action of the branch circuit 78 is such as to establish a fixed potential at the first output terminal O of this phase modulator which fixed potential may be represented on the voltage vector diagram of Figure 4 as the point O′, which is substantially at the center of the circular locus of the point P′. The point P′ is established by the potential at the second output terminal P, and varies about this arcuate locus as the relative reactance of the reactance tubes is varied by the modulation wave energy.

Figure 8:
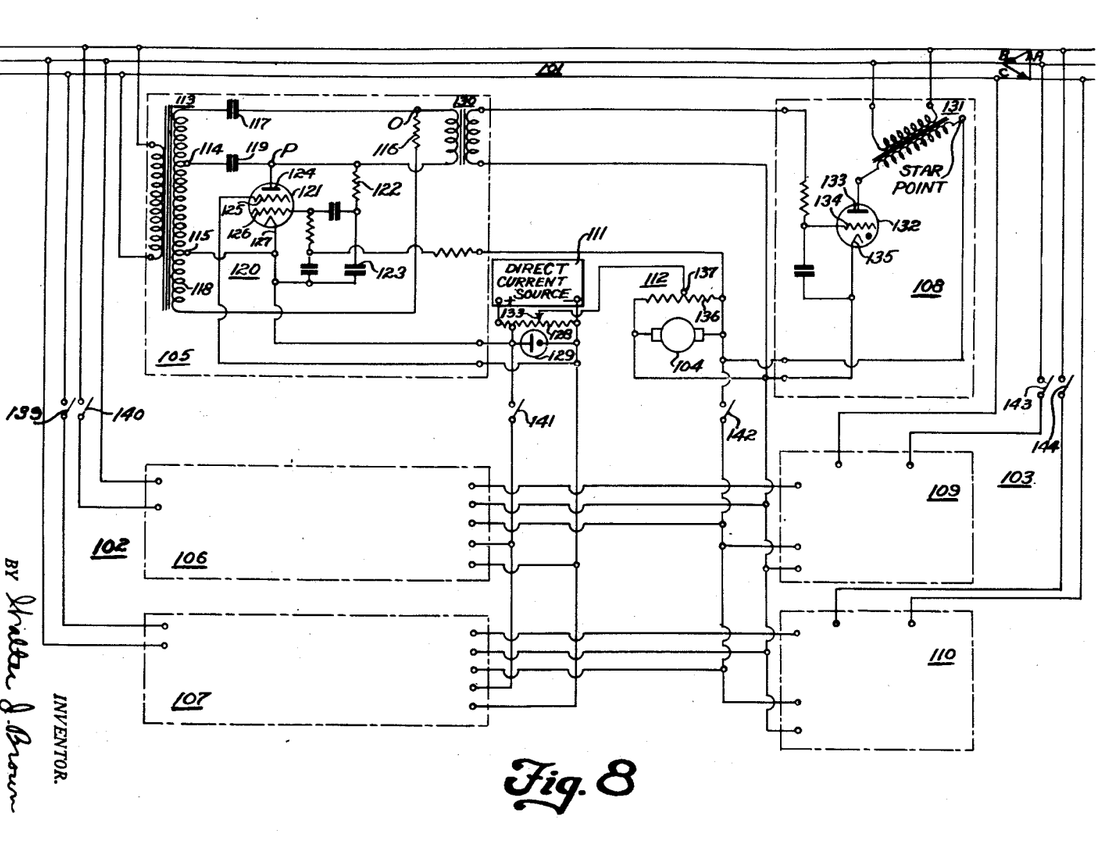
Figure 8 is a circuit diagram of a direct current motor system which includes the embodiment of my phase shifting system to control a grid controlled rectifier for the said direct current motor.

Figure 8 illustrates my phase shifting system as used in conjunction with a three phase power supply and a grid controlled rectifier for supplying rectified power to a direct current motor. The system includes generally, a direct current motor 104, a grid controlled rectifier system 103 for supplying rectified power to the motor 104, a phase shifting system 102 for controlling the grid controlled rectifier system 103, a direct current source 111 for supplying operating voltages to the phase shifting system 102, a control voltage supply 112 for controlling the operating conditions of the phase shifting system 102, and a three-phase supply source 101 for supplying alternating voltages to the phase shifting system 102 and to the grid controlled rectifier system 103. The phase shifting system 102 includes three phase shifters designated 105, 106 and 107 respectively. The grid controlled rectifier system 103 includes rectifiers 108, 109 and 110 respectively. The three-phase supply source 101 has three phases A, B, and C, with the phase shifters 105, 106 and 107 energized respectively from the phases A, B and C. The rectifiers 108, 109 and 110 are energized respectively from phases B, C and A. It will be seen that the rectifier 108 is energized from a different phase than the phase that is energizing the phase shifter 105. This has been done purposely as a safety measure which will be discussed more fully later. The motor control system is operable with only the phase shifter 105 and the rectifier 108, omitting the phase shifters 106 and 107 and the rectifiers 109 and 110. For this reason, the latter two phase shifters and rectifiers have been shown as having switches 139 to 144, for disconnection from the supply voltages and the load, which is to illustrate that the motor control system is operative either with or without these elements as part of the motor control system. The motor control system may be fully described by describing only the phase shifter 105 and rectifier 108, which will describe the operation of only single phase power supplied to the motor 104. It will be readily apparent to those skilled in the art that such a system for one phase may be easily duplicated for a three-phase system or any polyphase system.

The phase shifter 105 is of the type of phase shifting system as shown in the Figure 1, and vectorially illustrated in Figure 4. An input transformer 113, which is connected across phase A, has two taps 114 and 115 on the secondary 118 thereof. A resistance or resistive element 116 and a capacitance or capacitive element 117 are serially connected across the ends of the secondary 118, with the first output terminal O of the phase shifter connected therebetween. A capacitance or capacitive element 119 and a variable inductance or inductive element 120 are serially connected across the taps 114 and 115 with the second output terminal P of the phase shifter connected therebetween. The variable inductance 120 includes a thermionic tube 121, and a resistance 122 and capacitance 123 forming a quadrature feedback circuit to make the thermionic tube 121 exhibit the properties of a reactance tube, or in this case specifically as an inductance. The thermionic tube 121 has a plate 124, a screen grid 125, a control grid 126, and a cathode 127. Biasing and high voltage supplies are supplied to the tube 121 by a voltage divider 128 connected across the terminals of the direct current source 111. Positive direct current potentials are applied to the screen 125 and plate 124, and a negative potential is applied to the cathode 127. A voltage regulator tube 129 is connected across the plate and screen supply voltages. The operation of the phase shifter 105 is similar in operation to the operation of the circuit of Figure 1, wherein the potential of the output terminal P is variable throughout an arcuate locus by varying the variable inductance 120.

The rectifier 108 is illustrative of connection to one leg 131 of a delta-star connected three-phase transformer. The secondary of the leg 131 has a rectifier tube 132 and the motor 104 connected across it. The rectifier tube 132 has a plate 133, a control grid 134 and a cathode 135. The output of the rectifier tube 132 is supplied to the motor 104 by the aforementioned series connection. The output of the phase shifter 105 is supplied through an output transformer 130 to the grid 134 with respect to the cathode 135 of the rectifier tube 132. The star point, illustrated at one end of the secondary of the transformer leg 131, would be the star point or common point of the secondary of a three-phase transformer, if a three-phase rectifier system were used.

The control voltage supply 112 includes a shunt resistance 136 connected across the motor 104. The shunt resistance 136 has a tap connection 137 for supplying a direct current feedback voltage to the phase shifter 105 through a movable contact 138 on the voltage divider 128. The direct current feedback voltage obtained from the shunt resistance 136 supplies a negative voltage to the grid 126 of the tube 121, whereas the voltage divider 128 supplies either a negative or a positive voltage to control the amount of bias applied to the tube 121. The amount of bias supplied to the tube 121 determines the effective reactance of this tube, and consequently the operating position of the output terminal P on the arcuate locus of the voltage vector diagram.

In operation, the three-phase supply source 101 supplies an alternating voltage of fixed magnitude and phase relationship to both the rectifier 108 and the phase shifter 105. The phase shifter 105, being responsive to the control voltage supply 112, controls the rectifier 108 by supplying a phase shifted voltage from its output terminals O and P. The voltage vector diagram of Figure 4 represents the voltage vectors obtainable from the phase shifter 105, wherein the variable inductance 120, which is a reactance tube, varies the potential at the output terminal P about an arcuate locus, with the point O at the center thereof. The setting of the movable contact 138 governs the ultimate speed of the motor 104. The combination of the direct current feedback from the shunt resistor 136 and the voltage obtained from the voltage divider 128, determines the bias applied to the tube 121. This bias determines the effective reactance of the tube 121, and consequently the operating point on the arcuate locus of the voltage vector diagram. When there is a high bias, the tube 121 has a high impedance or high effective reactance, and the position of point P' will be at its farthermost clockwise position. In this position, the voltage vector O'P' on the vector diagram of Figure 4 is about 60 degrees lagging of a zero reference base line. The input voltage 115—114 obtained across the secondary of the input transformer 113 will be considered as the reference voltage having a zero phase according to standard electrical practice, or in other words the vector of the voltage 115—114 will be horizontal to the right. This vector represents the phase A, and, as will be seen at the upper right of the Figure 8, the vector representation is such that the phase B leads the phase A by 120 degrees. This means that the phase of the voltage applied to the rectifier 108 is 120 degrees leading with respect to the phase of the voltage supplying the phase shifter 105. Under a condition of high bias, with high effective reactance of the inductance 120, the vector O—P will be 60 degrees lagging the reference voltage 115—114, and the voltage applied across the plate 133 and cathode 135 of the rectifier tube 132 is 120 degrees leading this reference voltage. Therefore, it will be seen that the voltage applied to the grid 134 will be 180 degrees lagging the plate-cathode voltage. Under this condition, the tube will not fire during any portion of the cycle. This is the measure of safety which was recited earlier, in that should the tube 121 fail for any reason, which means it would have a theoretically infinite impedance, the phase of the voltage across the terminals O and P of this phase shifter 105 would then be such as to cause the rectifier 108 to be turned off. This measure of safety is quite important to prevent the motor from going to a high or full speed from its former predetermined speed setting upon the failure of the reactance tube. Care must be taken in the circuit design to prevent more than 180 degrees lagging current, or this will cause this rectifier tube to turn full on, with full excitation supplied to the motor 104. A fixed phase-shifting network may be supplied in the circuit in such a manner to prevent such an occurrence, and I have found that the output transformer 130 and the resistance-capacity filters in the grid circuits of the rectifier tubes cause a slight shift in phase, which also must be taken into account in the design of the circuit.

When there is a low negative bias condition applied to the tube 121, the impedance or effective reactance of this tube 121 is low, thereby shifting the operating point of the output terminal P in a counter-clockwise direction. The point P' on the voltage vector diagram may easily be shifted counter-clockwise sufficiently to permit the output voltage across the terminals O and P to be directly in phase with the voltage applied to the plate and cathode of the rectifier tube 132. This allows the rectifier tube 132 to have a full output. The control voltage supply 112 obtains a voltage that is proportional to speed from the shunt resistor 136. As the speed of the motor 104 increases, a greater voltage is obtained across the shunt resistor 136, thereby applying a more negative voltage to the grid 126 of the thermionic tube 121, which increases its effective reactance and thereby causes the output voltage O—P to be more lagging to reduce the output of the rectifier 108 and consequently lower the speed of the motor 104. Thus a balance is always maintained between the voltage taken from the motor armature and the voltage applied from the biasing voltage divider 128; thus the motor voltage is held substantially constant at a value dependent upon the setting of the voltage divider 128.

The operation of the phase shifter 105 and rectifier 108 are complete as they have been described as being excited from different phases of a three-phase supply. As mentioned above, other phase shifters 106 and 107 may be employed in conjunction with other rectifiers 109 and 110, by closing the switches 139, 140, 143 and 144. Switch means 141 are shown for connecting the direct current source 111 and the control voltage supply 112 to the phase shifters 106 and 107, and switch means 142 are also shown for connecting the output of the rectifiers 109 and 110 to the motor 104.

Alternatively, when only a single phase supply is available, the phase shifter 105 may be energized from the same phase as the rectifier 108, through a fixed phase shifting network which will displace the output voltage of the phase shifter so that the grid voltage of the rectifier can never lag by more than 180 degrees behind the voltage applied to the plate of the rectifier.

Figure 9:
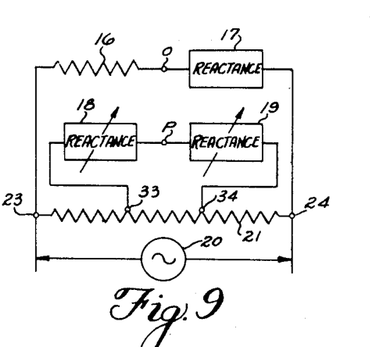
Figures 9, 10, 11 and 13 are circuit diagrams of further modifications of my phase shift systems.

Figure 9 shows a further modification of my phase shift system, which is similar to the circuit diagram shown in Figure 1, and which produces a voltage vector diagram similar to that shown in Figure 4. The Figure 9 differs from Figure 1 in that an alternating current source 20 has terminals 23 and 24 for energizing the phase shift systems. An impedance element 21 shown as a resistance having first and second intermediate terminals 33 and 34 is connected across the alternating current source 20. The variable reactive elements 18 and 19 are serially connected across the intermediate terminals 33 and 34 for obtaining a voltage therefrom. The voltage vector diagram of the circuit shown in Figure 9 may be represented by the voltage vector diagram shown in Figure 4. The resistance element 21 has replaced the inductive winding 11 and shows that any impedance element having intermediate taps may be used to obtain the voltage vector diagram of Figure 4. Any impedance element may be used for the resistance element 21, as long as all portions of this impedance shall have substantially the same phase angle. With all portions of the impedance element 21 having substantially the same phase angle, then the voltage vectors of all portions will lie consecutively end-to-end along a substantially straight line spanning the voltage vector $E_{20}$ which indicates the applied alternating voltage.

Figure 10:
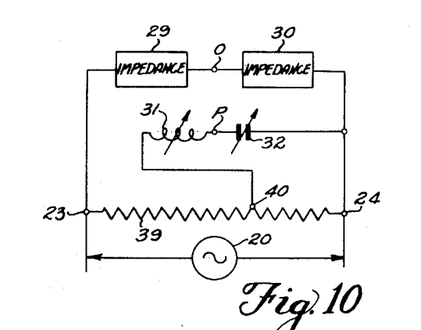

The schematic circuit diagram of Figure 10 is similar to the schematic diagram shown in Figure 2, and may also be represented by the voltage vector diagram shown in Figure 5. The circuit diagram of Figure 10 differs from that shown in Figure 2 by having a resistance element 39 connected across terminals 23 and 24 of an alternating current source 20. An intermediate tap 40 on the resistance element 39 provides a tap for applying voltage to the variable reactive elements 31 and 32. The resistance element 39 may be any form of impedance element having a substantially constant phase angle, regardless of what the phase angle may be, in both portions of this impedance element 39. As long as the impedance element 39 has a substantially constant phase angle throughout its length, the voltage vector diagram shown in Figure 5 will be applicable.

Figure 11:
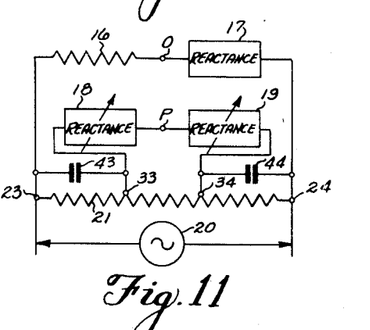
Figure 12:
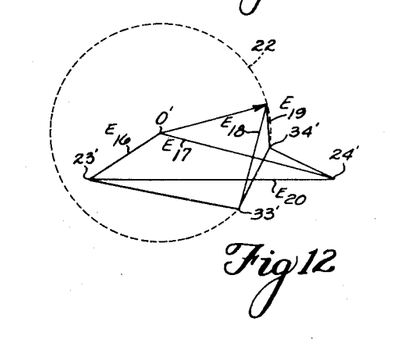
Figures 12 and 14 are voltage vector diagrams of the voltage vectors obtainable from the circuits of Figures 11 and 13, respectively.

The Figure 11 is a schematic circuit diagram showing a further modification of my invention which is a variation from the circuit shown in Figure 9, in that condensers 43 and 44 are shunted across the end portions of the resistance element. The condenser 43 is connected between the terminals 23 and 33, and the condenser 44 is connected between the terminals 34 and 24. The condensers 43 and 44 cause the voltage vectors obtainable from the circuit of Figure 11 to be slightly different than the voltage vectors shown in Figure 4. The voltage of the alternating current source 20 is shown in Figure 12 by the vector $E_{20}$ and the voltage across the various portions of the resistance element 21 is shown by the irregular path 23'—33'—34'—24'. The base line 33'—34' is therefore tilted sharply upward to the right, and hence the arcuate locus 22 of the point P' is thereby rotated counterclockwise from its position shown in Figure 4.

Figure 13:
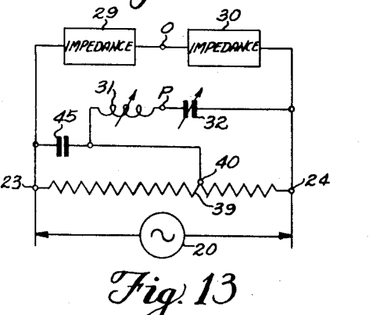

The schematic diagram shown in Figure 13 is a still further modification of my phase shift system, and is a variation of the circuit shown in Figure 10. The condenser 45 is shunted across the left-hand portion of the resistance element 39 such that in the voltage vector diagram of Figure 14 the resultant voltage vector of this portion, shown by the vector lying between the point 23' and 40', lags the applied voltage vector $E_{20}$, with vector rotation taken as counterclockwise.

Figure 14:
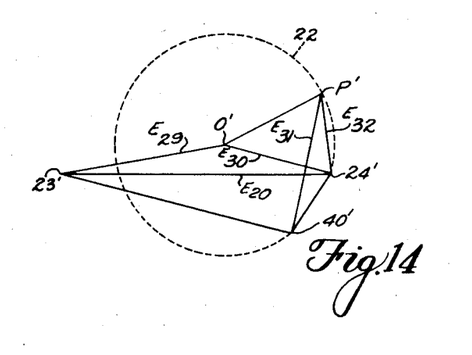

The voltage vector diagrams of Figures 12 and 14 each show that the base line for the arcuate locus 22 slopes upwardly toward the right. This is very desirable in many cases. For instance, in some applications, such as phase control circuits for grid controlled arc discharged tubes, the phase of the output voltage O'—P' should vary from 0 degrees to 180 degrees lagging. In such cases, an output transformer connected between the terminals O and P is often used to isolate the phase shift system from the control system proper, and this output transformer necessarily has an inductive component. In the voltage vector diagram of Figure 14, if the inductive component $E_{31}$ is made very large compared to $E_{32}$, then the point P' will be rotated to its extreme clockwise position. With an output transformer connected across the terminals O and P, the inductive component of this output transformer will prevent the point P' from rotating sufficiently clockwise to coincide with the point 24', and P' may therefore be spaced 10 or 20 degrees counterclockwise therefrom. By correct design of the circuit of Figure 13, the vector O'—24' may be correctly adjusted to be deflected downwardly from the horizontal 10 or 20 degrees, that is, in a lagging direction, such that the most clockwise rotational limit of the point P' will establish the limit of the vector O'—P' in a horizontal direction or an in-phase relationship relative to the applied voltage $E_{20}$.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A phase shifting network for a periodic voltage input and including a first and a second output terminal for establishing an output voltage therebetween, a resistive arm, a first reactive arm serially connected to said resistive arm with said first output terminal connected therebetween, means for exciting said resistive and first reactive arms with a periodic voltage having a definable magnitude and phase relationship with respect to said periodic voltage input, a second reactive arm, a third reactive arm opposite in sign to said second reactive arm and serially connected thereto with said second output terminal connected therebetween, means for exciting said second and third reactive arms with a periodic voltage having a definable magnitude and phase relationship with respect to said periodic voltage input, and means for varying the relative impedance of said second and third reactive arms, whereby said output voltage will be variable in phase with respect to said periodic voltage input.

2. A phase shifting network having an alternating voltage input including, a first and a second output terminal having an output voltage established therebetween, an impedance arm, a first capacitive arm serially connected to said impedance arm with said first output terminal connected therebetween, means for exciting said arms with a first alternating voltage having a definable magnitude and phase relationship with respect to said alternating voltage input, an inductive arm, a second capacitive arm serially connected to said inductive arm with said second output terminal connected therebetween, means for exciting said inductive and second capacitive arms with an alternating voltage having a definable magnitude and phase relationship with respect to said first alternating voltage, and means for varying the relative impedance of said inductive and second capacitive arms, whereby said output voltage will be variable in phase with respect to said first alternating voltage.

3. A phase shifting network having an alternating voltage input including, a first and a second output terminal having an output voltage established therebetween, a resistive arm, a first capacitive arm serially connected to said resistive arm with said first output terminal connected therebetween, means for exciting said arms with a first alternating voltage having a determinable magnitude and phase relationship with respect to said alternating voltage input, a first inductive arm, a second capacitive arm serially connected to said first inductive arm with said second output terminal connected therebetween, means for exciting said first inductive and second capacitive arms with an alternating voltage having a lesser magnitude and determinable phase relationship with respect to said first alternating voltage, means for varying the relative reactance of said first inductive and second capacitive arms, and means for maintaining a substantially constant Q in said first inductive and second capacitive arms over a desired part of a working range as said arms are relatively reactively varied, whereby said output voltage will have a substantially constant magnitude over said part of said working range, and will be variable in phase with respect to said first alternating voltage.

4. A phase shifting network having an alternating voltage input including, a first and a second output terminal having an output voltage established therebetween, an impedance arm, a first inductive arm serially connected to said impedance arm with said first output terminal connected therebetween, means for exciting said arms with a first alternating voltage having a determinable magnitude and phase relationship with respect to said alternating voltage input, a second inductive arm, a capacitive arm serially connected to said second inductive arm with said second output terminal connected therebetween, means for exciting said second inductive and said capacitive arms with an alternating voltage having a determinable magnitude and phase relationship with respect to said first alternating voltage, means for varying the relative impedance of said second inductive and said capacitive arms, whereby said output voltage will be variable in phase with respect to said first alternating voltage.

5. A phase shifting network having an alternating voltage input including, a first and a second output terminal having an output voltage established therebetween, a resistive arm, a first inductive arm serially connected to said resistive arm with said first output terminal connected therebetween, means for exciting said arms with a first alternating voltage having a determinable magnitude and phase relationship with respect to said alternating voltage input, a second inductive arm, a capacitive arm serially connected to said second inductive arm with said second output terminal connected therebetween, means for exciting said second inductive and said capacitive arms with a second alternating voltage having a lesser magnitude and determinable phase relationship with respect to said first alternating voltage, means for varying the relative reactance of said second inductive and said capacitive arms, and means for maintaining a substantially constant Q in said second inductive and said capacitive arms over a desired part of a working range as said arms are relatively reactively varied, whereby said output voltage will have a substantially constant magnitude over said part of said working range and will be variable in phase with respect to said first alternating voltage.

6. In combination with an alternating voltage source, the provision of a phase shifting network including a first and a second output terminal having an output established therebetween, a resistive arm, a reactive arm serially connected to said resistive arm with said first output terminal connected therebetween, a transformer winding for energizing said serially connected arms from said alternating voltage source, a capacitive arm, an inductive arm serially connected to said capacitive arm with said second output terminal connected therebetween, connection means for connecting said capacitive and inductive arms to a portion of said transformer winding, and means for varying the relative impedance of said capacitive and inductive arms, whereby said output voltage will be variable in phase with respect to said alternating voltage source.

7. In combination with a periodic voltage source, a phase shifting network having first and second output terminals for developing an output voltage thereacross, said phase shifting network including, first and second branch circuits adapted to be energized from said periodic voltage source, said first branch circuit including a resistance and a reactance serially connected with said first output terminal connected therebetween, said second branch circuit including a capacitive element and an inductive element serially connected with said second output terminal connected therebetween, and means for varying the relative reactance of said elements in said second branch circuit for varying the phase of the output voltage with reference to the periodic voltage source.

8. A phase shifting network including first, second, third and fourth terminals, a first reactive element connected between said first and third terminals, a resistive element connected between said first and fourth terminals, circuit means including a second reactive element connected between said second and third terminals, circuit means including a third reactive element connected between said second and fourth terminals, said second and third reactive elements being of opposite sign, input means for causing an alternating voltage to appear across said third and fourth terminals, said first and second terminals being the output terminals of said network, and means for varying the relative reactance of said second and third reactive elements whereby a relatively large phase shift is accomplished in the output voltage.

9. In combination with a source of periodic voltage having a winding energized therefrom, said winding having end connections and having at least one intermediate connection, the provision of a phase shifting network including a first and a second output terminal having an output voltage established therebetween, a resistive arm, a reactive arm serially connected to said resistive arm with said first output terminal connected therebetween, said arms being connected to said end connections of said winding, a capacitive arm, an inductive arm serially connected to said capacitive arm with said second output terminal connected therebetween, connection means for connecting said capacitive and inductive arms to said at least one intermediate connection and to another connection of said winding, and means for varying the relative reactance of said capacitive and inductive arms, whereby said output voltage will have an output variable in phase with respect to said periodic voltage source.

10. In combination with a source of periodic voltage having a winding energized therefrom, said winding having end connections and having two intermediate connections, the provision of a phase shifting network including a first and a second output terminal having an output voltage established therebetween, a resistive arm, a reactive arm serially connected to said resistive arm with said first output terminal connected therebetween, said arms being connected to said end connections of said winding, a capacitive arm, an inductive arm serially connected to said capacitive arm with said second output terminal connected therebetween, connection means for connecting said capacitive and inductive arms to said two intermediate connections, and means for varying the relative reactance of said capacitive and inductive arms, whereby said output voltage will be variable in phase with respect to said periodic voltage source.

11. In combination with a source of periodic voltage having a winding energized therefrom, said winding having end connections and having at least one intermediate connection, the provision of a phase shifting network including a first and a second output terminal having an output voltage established therebetween, a resistive arm, a reactive arm serially connected to said resistive arm with said first output terminal connected therebetween, said arms being connected to said end connections of said winding, a capacitive arm, an inductive arm serially connected to said capacitive arm with said second output terminal connected therebetween, connection means for connecting said capacitive and inductive arms to said at least one intermediate connection and to another connection of said winding, and means for varying the relative reactance of said capacitive and inductive arms and for maintaining a reasonably constant Q therein, whereby said output voltage will have a reasonably constant magnitude while variable in phase with respect to said periodic voltage source.

12. In combination with a source of periodic voltage having a winding energized therefrom, said winding having end connections and having two intermediate connections, the provision of a phase shifting network including a first and a second output terminal having an output voltage established therebetween, a resistive arm, a reactive arm serially connected to said resistive arm with said first output terminal connected therebetween, said arms being connected to said end connections of said winding, a capactive arm, an inductive arm serially connected to said capacitive arm with said second output terminal connected therebetween, connection means for connecting said capacitive and inductive arms to said two intermediate connections, and means for varying the relative reactance of said capacitive and inductive arms and for maintaining a reasonably constant Q therein, whereby said output voltage will have a reasonably constant magnitude while variable in phase with respect to said periodic voltage source.

13. In combination with an impedance branch adapted to have developed thereacross a periodic voltage, said impedance branch having end connections and having at least one intermediate connection, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said at least one intermediate connection and to another connection of said impedance branch, and means for varying the relative impedance of said capacitive and inductive arms, whereby said output voltage will be variable in phase with respect to the periodic voltage in said impedance branch.

14. In combination with an impedance branch adapted to have developed thereacross a periodic voltage, said impedance branch having end connections and having two intermediate connections, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said two intermediate connections of said impedance branch, and means for varying the relative impedance of said capacitive and inductive arms, whereby said output voltage will be variable in phase with respect to the periodic voltage in said impedance branch.

15. A phase shifting network having an alternating voltage input and including a first and a second output terminal having an output voltage established therebetween, a resistive arm, a first reactive arm serially connected to said resistive arm with said first output terminal connected therebetween, means for exciting said resistive and first reactive arms from said alternating voltage input, a second reactive arm, a third reactive arm of opposite sign relative to said second reactive arm and serially connected thereto with said second output terminal connected therebetween, means for exciting said second and third reactive arms from a reference voltage having a definable magnitude and phase relationship with respect to said alternating voltage input, and means for varying the relative impedance of said second and third reactive arms, whereby on a voltage vector diagram the potential of said second output terminal will describe a locus lying on an arc spanning the vector of said reference voltage, and said first output terminal will have a potential lying within the space bounded by said arc and said reference vector.

16. In combination with an impedance branch adapted to have developed thereacross a periodic voltage, said impedance branch having end connections and having at least one intermediate connection, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said at least one intermediate connection and to another connection of said impedance branch as a reference voltage, and means for varying the relative impedance of said capacitive and inductive arms, whereby on a voltage vector diagram the potential of the second output terminal will describe a locus lying on an arc spanning the vector of said reference voltage, and said first output terminal will have a potential lying within the space bounded by said arc and said reference vector.

17. In combination with an impedance branch adapted to have developed thereacross a periodic voltage, said impedance branch having end connections and having two intermediate connections, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said two intermediate connections of said impedance branch as a reference voltage, and means for varying the relative impedance of said capacitive and inductive arms, whereby on a voltage vector diagram the potential of the second output terminal will describe a locus lying on an arc spanning the vector of said reference voltage, and said first output terminal will have a potential lying within the space bounded by said arc and said reference vector.

18. A phase shifting network having an alternating voltage input and including a first and a second output terminal having an output voltage established therebetween, a resistive arm, a first reactive arm serially connected to said resistive arm with said first output terminal connected therebetween, means for exciting said resistive and first reactive arms from said alternating voltage input, a second reactive arm, a third reactive arm of opposite sign relative to said second reactive arm and serially connected thereto with said second output terminal connected therebetween, means for exciting said second and third reactive arms from a reference voltage having a definable magnitude and phase relationship with respect to said alternating voltage input, and means for varying the relative reactance of said second and third reactive arms while retaining a substantially constant Q over a desired range, whereby on a voltage vector diagram the potential of said second output terminal will describe a locus lying on a substantially circular arc spanning the vector of said reference voltage, and said first output terminal will have a potential lying in the region of the center of said substantially circular arc.

19. In combination with an impedance branch adapted to have developed thereacross a periodic voltage, said impedance branch having end connections and having at least one intermediate connection, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said at least one intermediate connection and to another connection of said impedance branch as a reference voltage, and means for varying the relative reactance of said second and third reactive arms while retaining a substantially constant Q over a desired range, whereby on a voltage vector diagram the potential of said second output terminal will describe a locus lying on a substantially circular arc spanning the vector of said reference voltage, and said first output terminal will have a potential lying in the region of the center of said substantially circular arc.

20. In combination with an impedance branch adapted to have developed thereacross a periodic voltage, said impedance branch having end connections and having two intermediate connections, the provision of a phase shifting network including a first and a second output terminal having an output voltage established therebetween, a resistive arm, a reactive arm serially connected to said resistive arm with said first output terminal connected therebetween, said arms being connected to said end connections of said impedance branch, a capacitive arm, an inductive arm serially connected to said capacitive arm with said second output terminal connected therebetween, connection means for connecting said capacitive and inductive arms to said two intermediate connections as a reference voltage, and means for varying the relative reactance of said second and third reactive arms while retaining a substantially constant Q over a desired range, whereby on a voltage vector diagram the potential of said second output terminal will describe a locus lying on a substantially circular arc spanning the vector of said reference voltage, and said first output terminal will have a potential lying in the region of the center of said substantially circular arc.

21. A phase shifting system for a periodic voltage input and including a first and a second output terminal for establishing an output voltage therebetween, a first circuit mesh comprising an impedance arm across which a periodic voltage may be developed having a definable magnitude and phase relationship with respect to said input, a resistive arm and a reactive arm with said first output terminal therebetween, a second circuit mesh comprising an inductive arm and a capacitive arm closed upon themselves and having said second output terminal therebetween, a connection between said first and second meshes, means for inducing into said inductive arm a periodic voltage having a definable magnitude and phase relationship with respect to said input, and means for varying the relative reactances of said inductive and capacitive arms, whereby said output voltage will be variable in phase with respect to said periodic voltage input.

22. A phase shifting system for a periodic voltage input and including a first and a second output terminal for establishing an output voltage therebetween, a first circuit mesh comprising an impedance arm across which a periodic voltage may be developed having a definable magnitude and phase relationship with respect to said input, a resistive arm and a reactive arm with said first output terminal therebetween, a second circuit mesh comprising an inductive arm and a capacitive arm closed upon themselves and having said second output terminal therebetween, a connection between said first and second meshes, means for inducing into said inductive arm a periodic voltage having a definable magnitude and phase relationship with respect to said input, and means for varying the relative reactances of said inductive and capacitive arms while maintaining a substantially constant Q over a desired part of a working range, whereby said output voltage will have a reasonably constant magnitude over said part of said working range and will be variable in phase with respect to said periodic voltage input.

23. A phase shifting system for a peridoic voltage input and including a first and a second output terminal for establishing an output voltage therebetween, a first circuit mesh comprising an inductive winding for energization from said periodic voltage input, a first impedance arm and a second impedance arm with said first output terminal therebetween, a second circuit mesh comprising an inductive arm and a capacitive arm closed upon themselves and having said second output terminal therebetween, a connection between said first and second meshes, means for inducing into said inductive arm a periodic voltage from said inductive winding by mutual inductance, and means for varying the relative impedance of said inductive and capacitive arms, whereby said output voltage will be variable in phase with respect to said periodic voltage input.

24. A phase shifting system for a periodic voltage input and including a first and a second output terminal for establishing an output voltage therebetween, a first circuit mesh comprising an inductive winding for energization from said periodic voltage input, a first impedance arm and a second impedance arm with said first output terminal therebetween, a second circuit mesh comprising an inductive arm and a capacitive arm closed upon themselves and having said second output terminal therebetween, a connection between said first and second meshes, means for inducing into said inductive arm a periodic voltage from said inductive winding by mutual inductance, and means for varying the relative reactances of said inductive and capacitive arms while maintaining a substantially constant Q over a desired part of a working range, whereby said output voltage will have a reasonably constant magnitude over said part of said working range and will be variable in phase with respect to said periodic voltage input.

WALTER J. BROWN.

REFERENCES CITED

The following references are of record in the file of this patent:

UNITED STATES PATENTS

| Number | Name | Date |
| --- | --- | --- |
| 1,717,400 | Nyquist | June 18, 1929 |
| 1,900,538 | Bedford | Mar. 7, 1933 |
| 1,901,694 | Bedford | Mar. 14, 1933 |
| 1,911,051 | Bedford | May 23, 1933 |
| 2,032,176 | Kavalsky | Feb. 25, 1936 |
| 2,160,528 | Usselman | May 30, 1939 |
| 2,229,448 | Jarman | Jan. 21, 1941 |